US012675698B2

(12) United States Patent
Rodriguez Mulet et al.

(10) Patent No.: US 12,675,698 B2
(45) Date of Patent: Jul. 7, 2026

(54) LEARNING APPARATUS AND METHOD

(71) Applicant: KABUSHIKI KAISHA TOSHIBA, Tokyo (JP)

(72) Inventors: Albert Rodriguez Mulet, Kawasaki Kanagawa (JP); Shuhei Nitta, Tokyo (JP); Ryusuke Hirai, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 693 days.

(21) Appl. No.: 18/174,343

(22) Filed: Feb. 24, 2023

(65) Prior Publication Data

US 2024/0028902 A1     Jan. 25, 2024

(30) Foreign Application Priority Data

Jul. 19, 2022     (JP) ................................. 2022-114969

(51) Int. Cl.
*G06N 3/082*          (2023.01)
(52) U.S. Cl.
CPC ................................... *G06N 3/082* (2013.01)
(58) Field of Classification Search
CPC ....................................................... G06N 3/082
USPC ......................................................... 706/25
See application file for complete search history.

(56) References Cited

U.S. PATENT DOCUMENTS

| | | | |
|---|---|---|---|
| 11,436,490 | B2 | 9/2022 | Tanizawa et al. |
| 2018/0114114 | A1 | 4/2018 | Molchanov et al. |

| | | | |
|---|---|---|---|
| 2020/0012945 | A1 | 1/2020 | Yaguchi et al. |
| 2020/0012954 | A1* | 1/2020 | Botea ...................... G06F 40/35 |
| 2021/0158166 | A1* | 5/2021 | Azarian Yazdi ....... G06N 3/048 |
| 2022/0083856 | A1 | 3/2022 | Yaguchi et al. |

(Continued)

FOREIGN PATENT DOCUMENTS

| | | |
|---|---|---|
| JP | 2020-8993 A | 1/2020 |
| JP | 2021-39460 A | 3/2021 |
| JP | 2021-43772 A | 3/2021 |

(Continued)

OTHER PUBLICATIONS

Hu et al., "Network trimming: a data-driven neuron pruning approach towards efficient deep architectures", arXiv: 1607.03250v1 [cs. NE] Jul. 12, 2016 (Year: 2016).*

(Continued)

*Primary Examiner* — Tsu-Chang Lee
(74) *Attorney, Agent, or Firm* — Finnegan, Henderson, Farabow, Garrett & Dunner, LLP

(57) ABSTRACT

According to one embodiment, a learning apparatus includes a processor. The processor trains a neural network model having a plurality of pathways and generate a trained model. The processor performs pruning on the trained model and calculate a number of remaining parameters of each of the pathways. The processor generates a candidate model for reconstruction, the candidate model for reconstruction being generated by deleting a pathway in which the number of parameters is equal to or less than a threshold. The processor determines whether or not deletion of a further pathway included in the candidate model for reconstruction is possible. If it is determined that deletion of the further pathway is possible, the candidate model for reconstruction is subjected to each of the training, the pruning, and the generating.

13 Claims, 8 Drawing Sheets

(56)                    References Cited

U.S. PATENT DOCUMENTS

2022/0114453  A1*   4/2022   Lee ........................ G06N 3/082
2023/0056947  A1    2/2023   Nitta et al.

FOREIGN PATENT DOCUMENTS

JP              6951295 B2     10/2021
JP            2022-49271 A      3/2022
KR      10-2022-0048832 A      4/2022

OTHER PUBLICATIONS

Anwar et al., "Structured pruning of deep convolutional neural networks", ACM journal on emerging technologies in computing systems, vol. 13, No. 3, Article 32, Feb. 2017 (Year: 2017).*
Hoefler et al., "Sparsity in deep learning: pruning and growth for efficient inference and training in neural networks", Journal of machine learning research 23 (2021) 1-124, 2021 (Year: 2021).*
Christian Szegedy et al., "Rethinking the Inception Architecture for Computer Vision," Computer Vision and Patter Recognition (CVPR), arXiv1512.00567v3, 10 pages (2015).
Japan Patent Office, Office Action in JP Application No. 2022-114969, (Nov. 4, 2025).

* cited by examiner

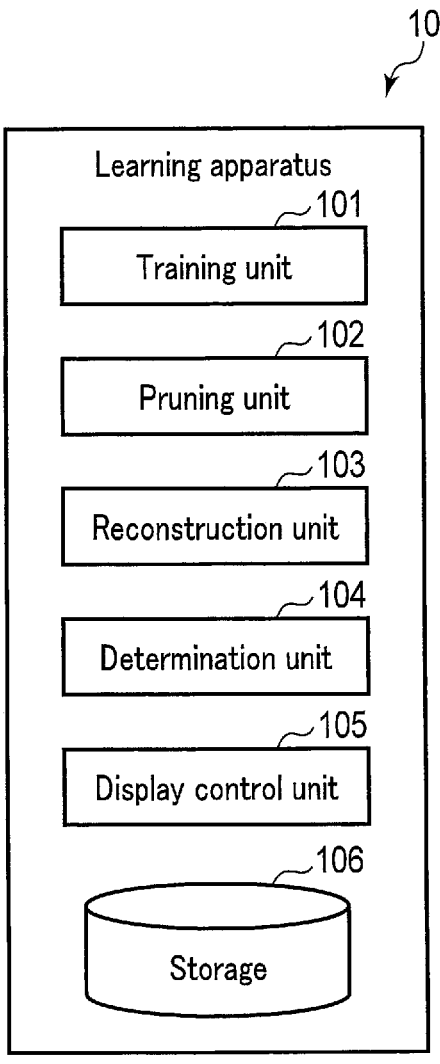
F I G. 1

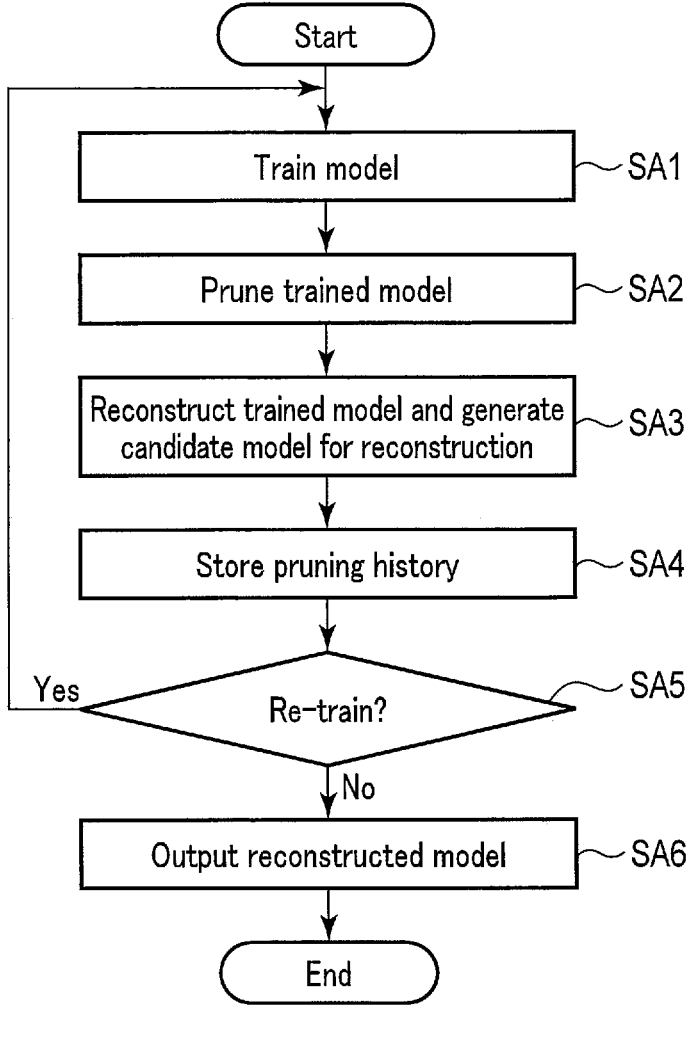
F I G. 2

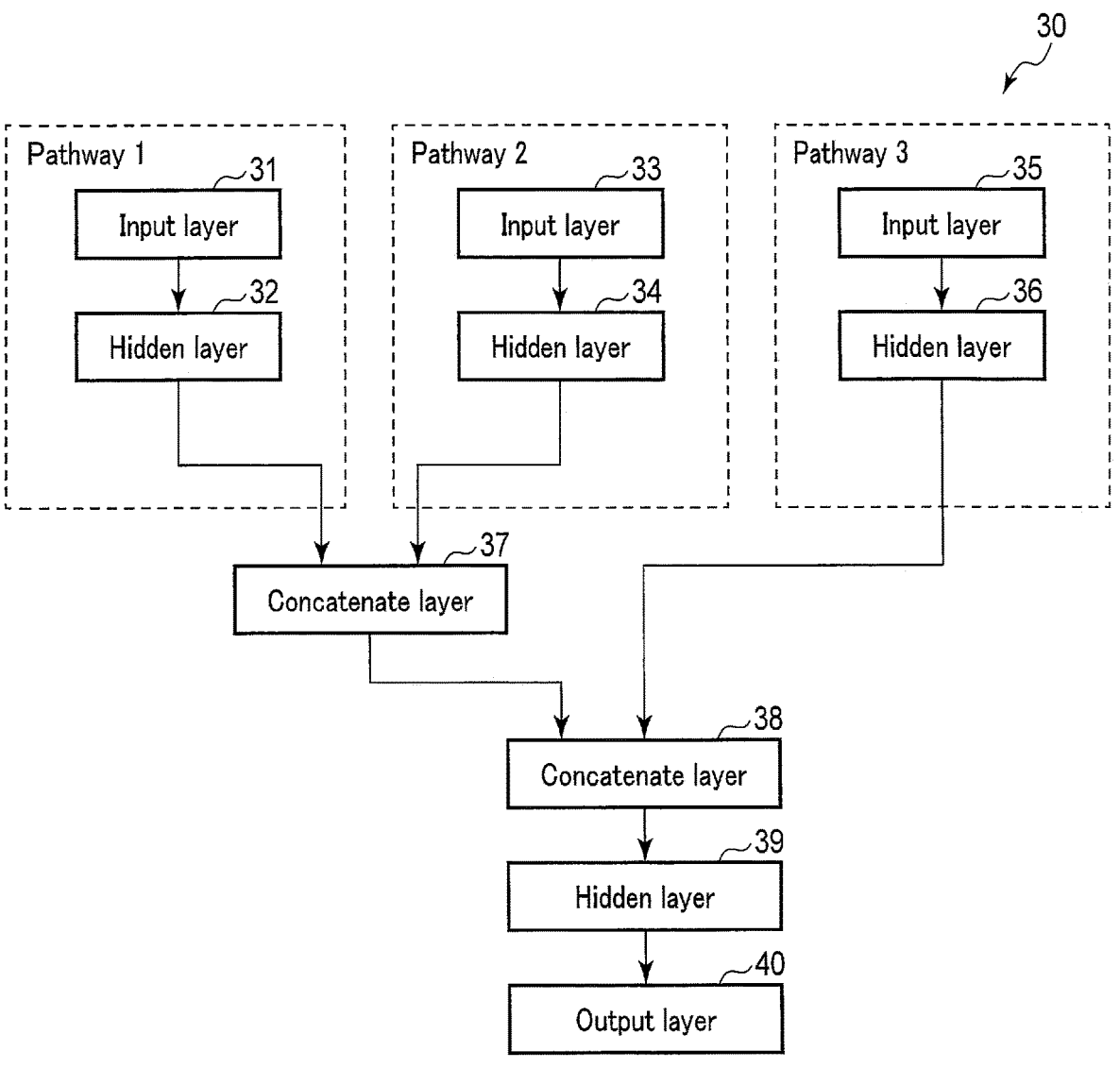
F I G. 3

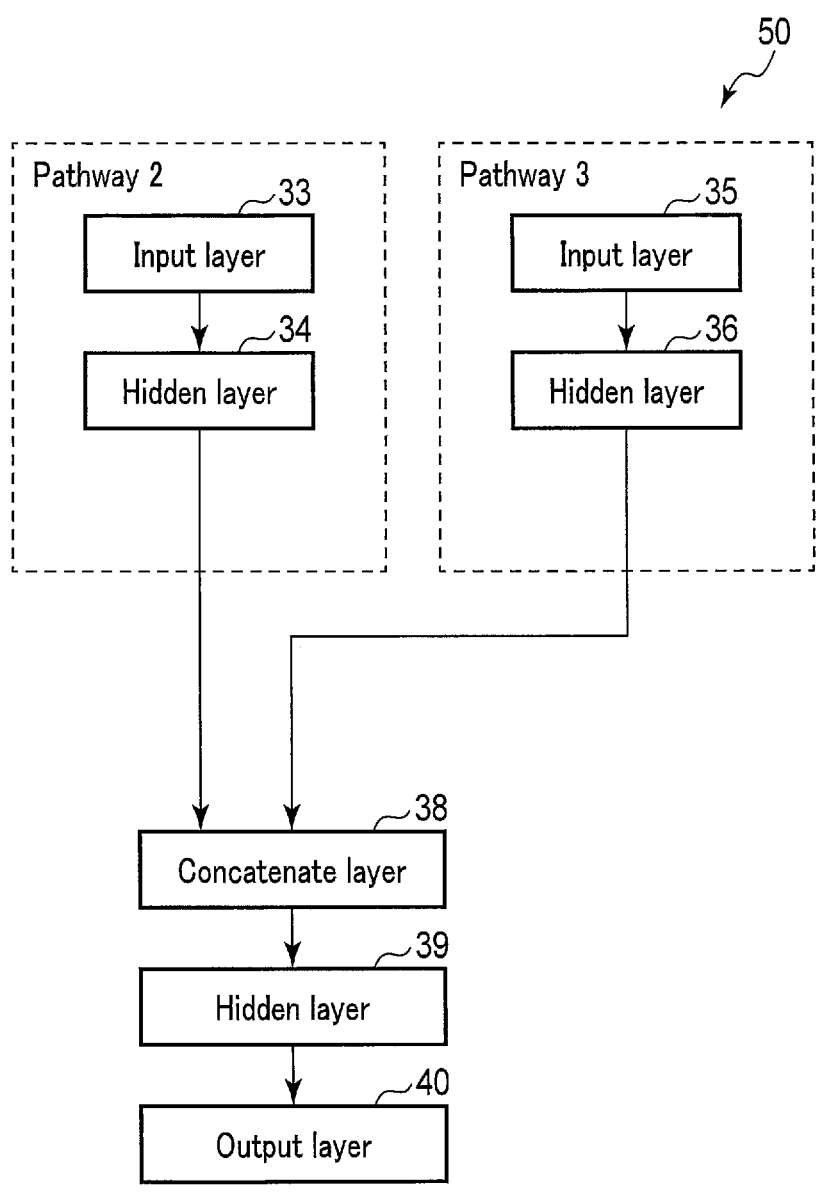
F I G. 4

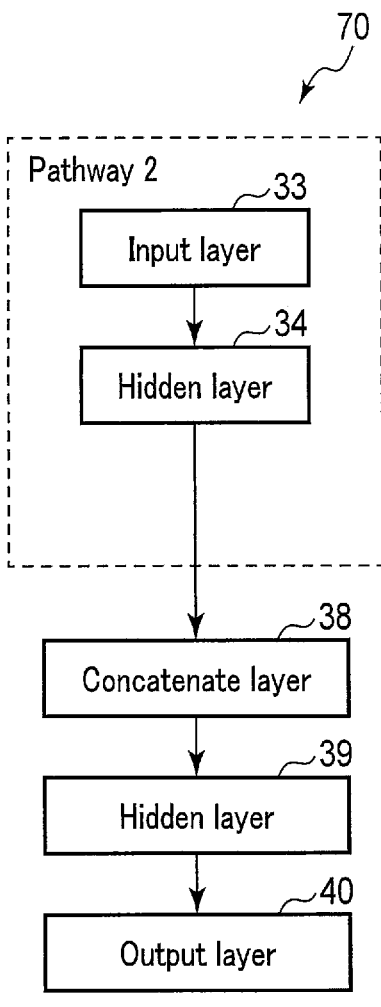
F I G. 5

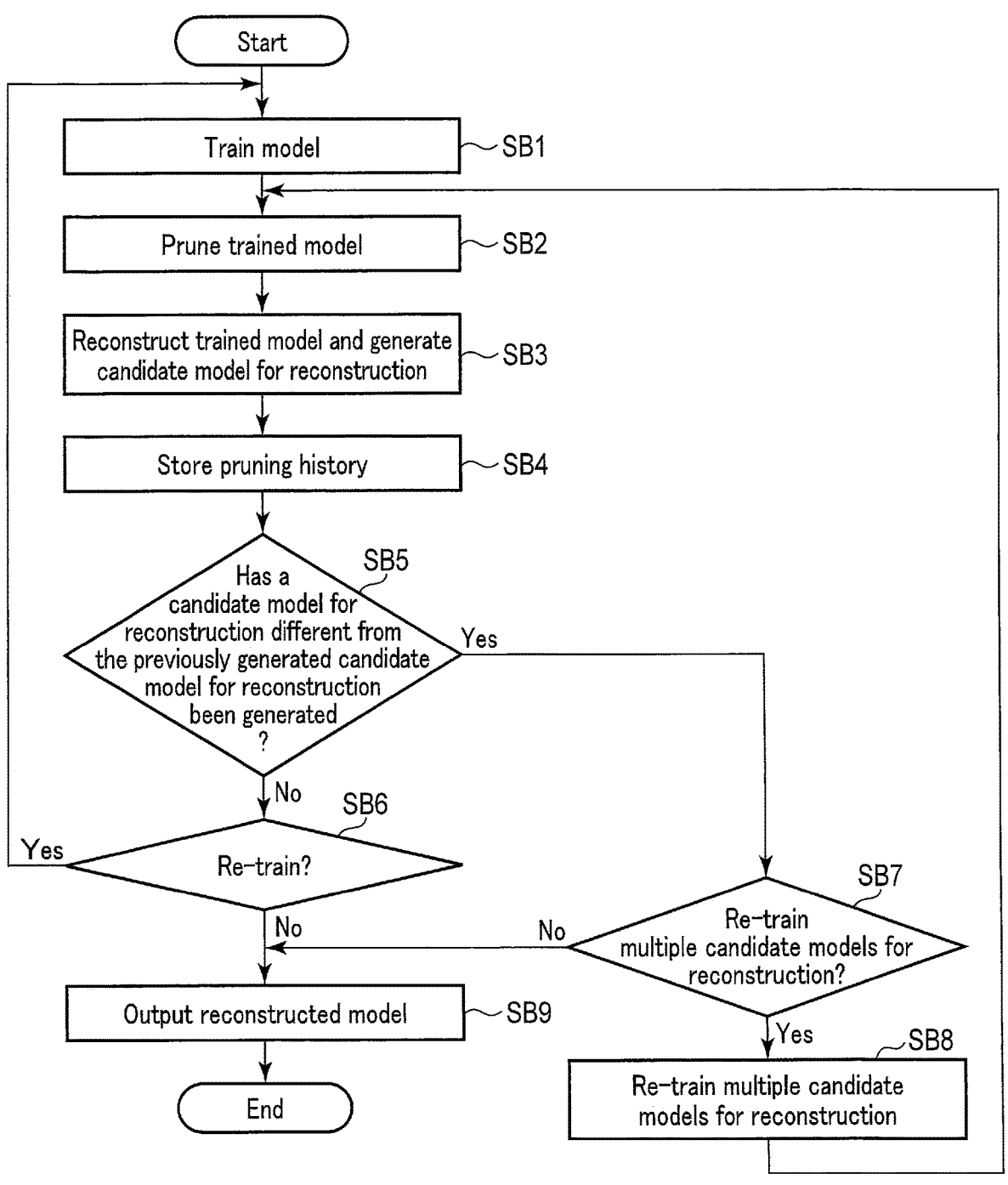
F I G. 6

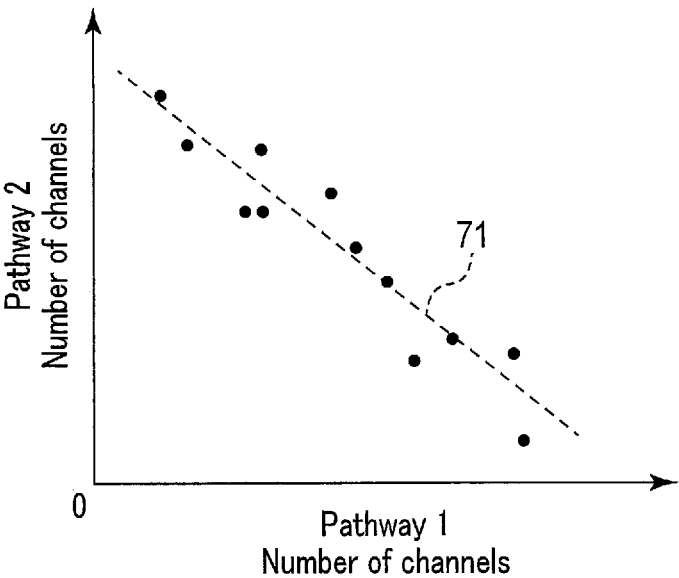
F I G. 7
| Pathway 1 | Pathway 2 | Pathway 3 |
|---|---|---|
| 55 | 10 | 15 |
| 0 | 60 | 28 |
| − | 40 | 3 |
| − | 60 | 0 |
| − | 58 | − |
| ... | ... | ... |
F I G. 8

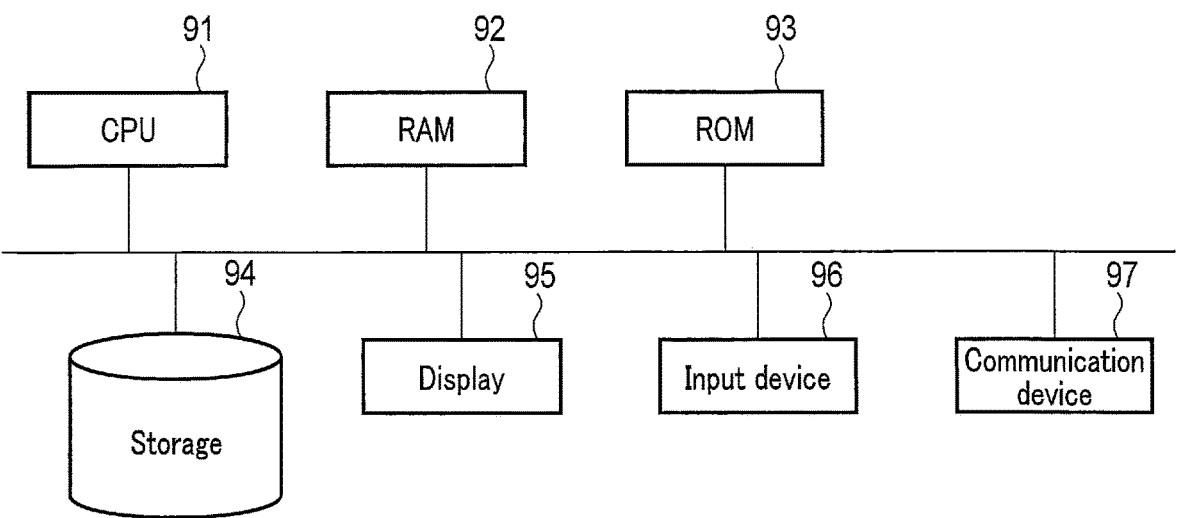
F I G. 9

LEARNING APPARATUS AND METHOD

CROSS-REFERENCE TO RELATED APPLICATION

This application is based upon and claims the benefit of priority from Japanese Patent Application No. 2022-114969, filed Jul. 19, 2022, the entire contents of which are incorporated herein by reference.

FIELD

Embodiments described herein relate to a learning apparatus and method.

BACKGROUND

There is a technique called pruning as a method of reducing the model size of a neural network. Pruning removes a parameter (a weight coefficient or a channel) of a neural network, thereby allowing for reduction of the model size of the neural network while maintaining an accuracy of inference.

However, although pruning can efficiently optimize a pathway and reduce the model size if stable processing results can be obtained under the same learning conditions, it is difficult to efficiently reduce the model size if the learning is unstable. For example, in a neural network in which a plurality of pathways including a hidden layer are combined, the learning is likely to be unstable, and pruning also exhibits unstable behavior. Therefore, it is difficult to efficiently perform pruning.

BRIEF DESCRIPTION OF THE DRAWINGS

FIG. 1 is a block diagram showing a learning apparatus according to an embodiment.

FIG. 2 is a flowchart showing an example of an operation of the learning apparatus according to the embodiment.

FIG. 3 is a diagram showing the first stage of an example of a pruning process of a reconstructed model.

FIG. 4 is a diagram showing the second stage of the example of the pruning process of a reconstructed model.

FIG. 5 is a diagram showing the third stage of the example of the pruning process of a reconstructed model.

FIG. 6 is a flowchart showing an example of an operation of the learning apparatus performed on a plurality of candidate models for reconstruction.

FIG. 7 is a graph showing an example of a negative correlation between pathways.

FIG. 8 is a diagram showing an example of displaying pruning results.

FIG. 9 is a diagram showing an example of a hardware configuration of the learning apparatus.

DETAILED DESCRIPTION

In general, according to one embodiment, a learning apparatus includes a processor. The processor trains a neural network model having a plurality of pathways and generate a trained model. The processor performs pruning on the trained model and calculate a number of remaining parameters of each of the pathways. The processor generates a candidate model for reconstruction, the candidate model for reconstruction being generated by deleting a pathway in which the number of parameters is equal to or less than a threshold. The processor determines whether or not deletion of a further pathway included in the candidate model for reconstruction is possible. If it is determined that deletion of the further pathway is possible, the candidate model for reconstruction is subjected to each of the training, the pruning, and the generating.

Hereinafter, a learning apparatus, method, and program according to the present embodiment will be described in detail with reference to the drawings. In the embodiment described below, elements assigned the same reference numeral perform the same operation, and repeat descriptions will be omitted as appropriate.

A learning apparatus according to a present embodiment will be described with reference to the block diagram of FIG. 1.

A learning apparatus 10 according to the present embodiment includes a training unit 101, a pruning unit 102, a reconstruction unit 103, a determination unit 104, a display control unit 105, and a storage 106.

The training unit 101 trains a neural network model that includes a plurality of pathways based on training data and training conditions, and generates a trained model. The neural network model that includes a plurality of pathways is a neural network model having a plurality of pathways arranged between an input layer and an output layer. For example, it is a neural network model in which a plurality of modules are combined and an output from each module is integrated in the middle. Also, the neural network model may be any network such as a convolutional neural network (CNN) including VGG16, ResNet, DenseNet, etc., a recurrent neural network (RNN), a transformer, or a graph neural network, provided that it has an architecture having a plurality of pathways.

The pruning unit 102 performs pruning on the trained model and calculates the number of remaining parameters of each of the pathways. The number of parameters is at least one of the following: the number of weight coefficients and the number of channels.

The reconstruction unit 103 generates a candidate model for reconstruction, which is a trained model generated by deleting a pathway having a number of parameters that is equal to or less than a threshold. If there is no pathway that can be deleted among the pathways included in the candidate model for reconstruction, or if predetermined termination conditions are satisfied, the reconstruction unit 103 selects the candidate model for reconstruction as a reconstructed model for which pruning has been completed.

The determination unit 104 determines whether deletion of a further pathway included in the candidate model for reconstruction is possible or not. The determination unit 104 further determines whether re-training is necessary or not based on a pruning history. The pruning history is data associating a history of pruning results obtained when pruning is performed multiple times by the pruning unit 102 and a history of the corresponding candidate model for reconstruction.

The display control unit 105 performs control so that the pruning history is displayed on an external display device such as a display.

The storage 106 stores the training data, neural network model, pruning results, candidate model for reconstruction, reconstructed model, and the like.

Next, an example of an operation of the learning apparatus 10 according to the present embodiment will be described with reference to the flowchart shown in FIG. 2.

In the present embodiment, the operation of the learning apparatus 10 will be described by taking an example in which an image is used as training data and a neural network that performs a two-class image classification task of classifying the image into either a dog or a cat is trained. The training data is not limited to an image, and may be a video or time-series data such as text, voice, sensing data, and the like. A task inferred by the neural network is not limited to a classification task, and other tasks such as object detection, semantic segmentation, recurrence, and prediction can also be applied in the same manner. In the embodiment below, descriptions will be given assuming units of channels of a neural network model and a candidate model for reconstruction to be a parameter for pruning; however, pruning may be performed in units of weight coefficients of a neural network model and a candidate model for reconstruction, or performed in any unit and by any method such as performing pruning in units of modules constituting the plurality of pathways.

In step SA1, the training unit 101 trains a neural network model and generates a trained model. For example, supervised learning that uses training data including correct data may be performed for training the neural network model. Specifically, an input image $\vec{x}_i$ (i=1, . . . , N) is set. N is a natural number of two or more. The superscript arrow indicates a vector set. i represents serial numbers of the training data and the number of pieces of training data. The input image $\vec{x}_i$ is a set of pixels with a horizontal width W and a vertical width T, and is a W×T-dimensional vector.

The target label $\vec{t}_i$ is a two-dimensional vector having an element corresponding to a target label as 1 and the other elements as 0. Specifically, if the input image $\vec{x}_i$ is a dog, $(1,0)^T$ may be indicated, and if the input image $\vec{x}_i$ is a cat, $(0,1)^T$ may be indicated. $(\ )^T$ indicates a row vector.

In the training of the neural network model, an output $\vec{y}_i$ of the neural network model as a result of inputting the input image $\vec{x}_i$ can be represented by Formula (1). The output $\vec{y}_i$ is an estimation probability value, wherein $$\vec{y}_i = f(\vec{\Theta}, \vec{x}_i) \tag{1}$$

where $f(\vec{\Theta}_i)$ is a function of the neural network model that holds a parameter set $\vec{\Theta}$, and outputs a two-dimensional vector.

For a training error $L_i$, a case of using a calculation formula represented by Formula (2) is assumed. ln is a natural logarithm.

$$L_i = -\vec{t}_i^T \ln(\vec{y}_i) \tag{2}$$

A cross-entropy of the target label $\vec{t}_i$ and the output $\vec{y}_i$ of the neural network model is used for calculation. In the present embodiment, the parameter set $\vec{\Theta}$ of the neural network model is subjected to iterative mini-batch training using back propagation and stochastic gradient descent, so as to minimize the loss function L based on a weighted average of the training errors $L_i$.

In the present embodiment, setting an optimizer to "Adam (learning rate: 0.01)", L2 regularization intensity λ to "0.001", an epoch number to "100", and a mini-batch size to "64" as the training conditions, the training unit 101 trains the neural network model. The training method using these training conditions causes group-level sparsification in the channels in the hidden layer included in the neural network model and the candidate model for reconstruction. In the case of training the neural network model and the candidate model for reconstruction again, the training unit 101 may train them under other training conditions, such as a different learning rate or a different regularization intensity, or train them under multiple training conditions and adopt one that exhibits better performance.

For example, a determination of whether or not a determination index, such as an absolute value, a decrement amount, or the like of the output training error $L_i$ or the output loss function L is equal to or below a threshold may be used as the condition for terminating the iterative training. If the determination index is equal to or below a threshold, the training unit 101 (or the determination unit 104) may determine that the condition for terminating the iterative training is satisfied. Alternatively, if the training unit 101 determines that the number of iterations reaches a predetermined number of times, it can be determined that the condition for terminating the iterative training is satisfied. When the iterative training is terminated, training of the neural network model is completed, and the trained model is generated.

The training of the neural network is not limited to the above instances, and any method may be used to train the neural network. The training error $L_i$ may be calculated using a binary cross entropy. In addition, although the above-described binary classification into dog and cat assumes inclusion of a sigmoid function in the output layer of the function f, a softmax function may be used for the output layer of the function f if a multiclass classification problem that involves classification into three or more classes is to be adopted.

In step SA2, the pruning unit 102 performs pruning on the trained model. The pruning involves, for example, calculation of an L2 norm of each channel in the hidden layer included in each pathway and calculation of the pruning result indicating the number of channels in each pathway having an L2 norm larger than a predetermined threshold (e.g., $10^{-6}$) among the pathways having an L2 norm. Other general methods may be used for the pruning method.

In step SA3, the reconstruction unit 103 reconstructs a trained model based on the pruning result obtained in step SA2, and generates a candidate model for reconstruction. For example, if there is a pathway that has obtained a pruning result indicating that the number of remaining channels in the hidden layer is equal to or below a threshold (i.e., it may be zero), the pathway may be deleted, and a trained model may be reconstructed with the remaining pathways to generate a candidate model for reconstruction. If there is no pathway in which the number of channels in the hidden layer is equal to or below a threshold, the model structure will be the same as the model structure of the trained model prior to pruning.

In step SA4, the storage 106 stores, as a pruning history, the pruning result of each pathway calculated and the corresponding candidate model for reconstruction in such a manner as to associate them with each other. They may be stored in the storage 106 in association with the number of executions indicating how many times the pruning has been executed.

In step SA5, the determination unit 104 determines whether or not to re-train the candidate model for reconstruction. For example, if there is only one pathway in the candidate model for reconstruction, the determination unit 104 determines that re-training is unnecessary. On the other hand, if there are multiple pathways, the determination unit 104 determines that re-training is necessary. Even if there are multiple pathways, the determination unit 104 may determine that re-training is unnecessary if the result of the pruning performed on the candidate model for reconstruction is stable. For example, if a comparison between a pruning result obtained in the past and a new pruning result obtained this time shows that the variation in the number of remaining channels is within a threshold, for example, that the difference in the number of channels is within a threshold, it can be said that the pruning result is stable; thus, the determination unit 104 may determine that re-training is unnecessary.

If it is determined that re-training is necessary, the process returns to step SA1, and the same processing is repeated. That is, re-training is performed on the candidate model for reconstruction, and pruning is performed on the candidate model for reconstruction after the re-training. On the other hand, if it is determined that re-training is unnecessary, the process proceeds to step SA6. That is, re-training is performed until the number of pathways included in the candidate model for reconstruction is one or the variation in the pruning results of one or more pathways becomes less than a threshold.

In step SA6, the determination unit 104 finally outputs a candidate model for reconstruction subjected to optimal pruning (hereinafter referred to as "a reconstructed model"). The reconstructed model may be stored in the storage 106. Through the above process, the operation of the learning apparatus 10 is ended.

If pruning is repeatedly performed on a single neural network model or a single candidate model for reconstruction multiple times and the pruning results obtained demonstrate that there is a pathway showing a number of remaining channels that is equal to or below a threshold a predetermined number of times or more, the reconstruction unit 103 may reconstruct the model so as to delete this pathway. That is, step SA1 and step SA2 are repeatedly performed on a single neural network model or a single candidate model for reconstruction. Thus, the accuracy of determining the pathway to be deleted can be enhanced.

Next, an example of the pruning process according to the present embodiment performed until a reconstructed model is generated will be described with reference to FIGS. 3 to 5.

FIG. 3 shows a neural network model 30 before being subjected to pruning. The neural network model 30 includes a pathway 1 (an input layer 31 and a hidden layer 32), a pathway 2 (an input layer 33 and a hidden layer 34), a pathway 3 (an input layer 35 and a hidden layer 36), a concatenate layer 37, a concatenate layer 38, a hidden layer 39, and an output layer 40. Herein, a case is assumed where the pathways 1, 2, and 3 have the same layer structure but the hidden layers of the pathways have different parameters from each other.

An input image $x^{\rightarrow}_i$ is input to each of the input layers 31, 33, and 35. The output from the pathway 1 and the output from the pathway 2 are integrated in the concatenate layer 37. The output from the concatenate layer 37 and the output from the pathway 3 are integrated in the concatenate layer 38. The output from the concatenate layer 38 is input to the hidden layer 39, the output from the hidden layer 39 is input to the output layer 40, and an estimation probability value $y^{\rightarrow}_i$ is output. An activation function, such as ReLU, is arranged in the subsequent stage of each of the hidden layers 32, 34, 36, and 39. The input images $x^{\rightarrow}_i$ input to the input layers 31, 33, and 35, respectively, may be the same image; alternatively, different images, such as so-called data-reinforced images that have undergone rotation, cropping, and color change, may be input to the input layers, respectively.

Herein, a case is assumed where, through the pruning of step SA2 shown in FIG. 2, the number of remaining channels in the hidden layer 32 of the pathway 1 is equal to or below a threshold, and the number of remaining channels in the hidden layer 34 of the pathway 2 and the number of remaining channels in the hidden layer 36 of the pathway 3 are larger than a threshold. In this case, the pathway 1 can be deleted.

FIG. 4 shows a candidate model for reconstruction 50 obtained after deletion of the pathway 1. Since deleting the pathway 1 eliminates the necessity of integrating the output from the pathway 1 and the output from the pathway 2, the concatenate layer 37 becomes unnecessary and will also be deleted.

Herein, it is assumed that a determination has been made that the candidate model for reconstruction 50 shown in FIG. 4 needs re-training because it has multiple pathways. Thus, the process from step SA1 to step SA4 shown in FIG. 2 is performed again. Herein, a case is assumed where the number of remaining channels in the hidden layer 36 of the pathway 3 is equal to or below a threshold, and the number of remaining channels in the hidden layer 34 of the pathway 2 is larger than a threshold. In this case, the pathway 3 can be deleted.

FIG. 5 shows a candidate model for reconstruction 70 obtained by deleting the pathway 3 from the candidate model for reconstruction 50. Since the candidate model for reconstruction shown in FIG. 5 has one pathway, it is output as a final reconstructed model. Applying each of the processing steps of iterative learning, pruning, and reconstruction to the neural network model and the candidate model for reconstruction and gradually deleting the pathways, as described above, can realize efficient pruning.

Although the example shown in FIGS. 3 to 5 assumes the case where the neural network model has three pathways, the number of pathways is not limited thereto and may be two, or four or more. Furthermore, the structures of the pathways, such as the number of hidden layers and the type of the hidden layer, may differ from each other. Although the example shown in FIG. 3 assumes the case where the neural network model has two concatenate layers, the neural network model may have architecture that integrates all the outputs from the respective pathways in a single concatenate layer. Also, although the example of integrating the outputs from the respective pathways in the concatenate layers is shown, the outputs from the respective pathways may be added.

FIGS. 3 to 5 show the case where multiple pathways are arranged in the stage of the input layers, multiple inputs are made to different pathways, respectively, and the outputs of the multiple pathways are integrated in a layer; however, the embodiment is not limited thereto. A neural network model having architecture in which there is one input layer and this input layer is branched into multiple pathways in the middle of the neural network model may also be adopted.

Pruning may be performed on the same neural network model and candidate model for reconstruction multiple times. If the results of the pruning performed multiple times indicating that the same pathway is to be deleted are obtained, it can also be determined that it is highly likely that this pathway can be deleted.

If the result of the first pruning and the result of the second pruning differ from each other, a candidate model for reconstruction may be generated in multiple patterns. For example, taking the example shown in FIG. 3 for explanation, it is assumed that, in the result of the first pruning performed on the neural network model 30, the pathway 1 can be deleted, and a first candidate model for reconstruction that includes the pathway 2 and the pathway 3 is generated, and that, in the result of the second pruning performed on the neural network model, the pathway 2 can be deleted, and a second candidate model for reconstruction that includes the pathway 1 and the pathway 3 is obtained. In this case, each of the processing steps of training, pruning, and reconstruction may be performed on the multiple candidate models for reconstruction obtained, that is, the first candidate model for reconstruction and the second candidate model for reconstruction.

An example of an operation of the learning apparatus 10 performed on multiple candidate models for reconstruction will be described with reference to the flowchart shown in FIG. 6.

In step SB1, as in step SA1 shown in FIG. 2, the training unit 101 trains a neural network model and generates a trained model.

In step SB2, as in step SA2 shown in FIG. 2, the pruning unit 102 performs pruning on the trained model.

In step SB3, as in step SA3 shown in FIG. 2, the reconstruction unit 103 reconstructs a trained model based on the result of the pruning and generates a candidate model for reconstruction.

In step SB4, the storage 106 stores the pruning history.

In step SB5, the determination unit 104 determines whether or not the candidate model for reconstruction generated in step SB4 differs from the previously generated candidate model for reconstruction, in other words, the determination unit 104 determines whether or not a candidate model for reconstruction different from the previously generated candidate model for reconstruction is generated. Specifically, if a candidate model for reconstruction which has a pathway different from that of the candidate model for reconstruction generated in the present step is stored in the storage 106, for example, the determination unit 104 may determine that a candidate model for reconstruction different from the previously generated candidate model for reconstruction is generated. If a candidate model for reconstruction different from the previously generated candidate model for reconstruction is generated, the process proceeds to step SB7; and if the same candidate model for reconstruction as the previously generated candidate model for reconstruction is generated, the process proceeds to step SB6.

In step SB6, the determination unit 104 determines whether re-training of the candidate model for reconstruction is necessary or not, as in the case of step SA5 shown in FIG. 2, since the candidate model for reconstruction is the same as the previously generated candidate model for reconstruction. If re-training is necessary, the process returns to step SB1 and the same process is repeated; and if re-training is unnecessary, the process proceeds to step SB9.

In step SB7, the determination unit 104 determines whether or not re-training is necessary for the multiple candidate models for reconstruction. For example, if a candidate model for reconstruction having a different pathway is newly generated, all the candidate models for reconstruction including the previously generated candidate models for reconstruction may be re-trained. Among the multiple candidate models for reconstruction, a candidate model for reconstruction which satisfies predetermined conditions may be re-trained, and a candidate model for reconstruction which does not satisfy the predetermined conditions may not be re-trained. For example, the determination unit 104 may determine that, among the multiple candidate models for reconstruction, a candidate model for reconstruction with the highest performance, specifically a candidate model for reconstruction with the highest recognition rate or the highest correctness rate, is an object to be re-trained. Alternatively, the determination unit 104 may determine that a candidate model for reconstruction with the smallest model size, specifically a candidate model for reconstruction with the smallest number of parameters or the smallest computing amount, is an object to be re-trained. Alternatively, an object to be re-trained is not limited to a single candidate model for reconstruction; and one or more candidate models for reconstruction with a model performance that is equal to or above a threshold, or one or more candidate models for reconstruction with a model size that is equal to or below a threshold, may be an object to be re-trained.

If it is determined that re-training is necessary, the process proceeds to step SB8; and if it is determined that re-training is unnecessary, the process proceeds to step SB9.

In step SB8, the training unit 101 re-trains the candidate model for reconstruction to be re-trained. The training method adopted in this step may be the same as that adopted in step SB1. Thereafter, the process returns to step SB2, and the same process is repeated.

In step SB9, the determination unit 104 outputs a candidate model for reconstruction for which re-training has been completed as a final reconstructed model. The storage 106 may store the reconstructed model. Also, as in the case shown in FIG. 2, pruning results may be calculated multiple times for a single neural network model or a single candidate model for reconstruction, and the reconstruction unit 103 may delete a pathway that has a number of remaining channels that is equal to or below a threshold a predetermined number of times or more.

If the budget and the time are limited by the time when a reconstructed model having undergone the pruning performed by the learning apparatus according to the present embodiment is generated, the processing may be terminated early when a predetermined time elapses without further performance of the re-training. In this case, the determination unit 104 may determine, among the multiple candidate models for reconstruction stored in the storage 106, a candidate model for reconstruction with the highest performance or a candidate model for reconstruction with the smallest model size to be a candidate model for reconstruction.

Also, if the budget and the time are limited, the conditions for generating a candidate model for reconstruction based on the pruning result may be alleviated in the processing of step SB4. For example, according to the remaining time, the reconstruction unit 103 may reconstruct a model in such a manner as to delete the pathways having a number of remaining channels that is below a threshold and keep only the pathways having a number of remaining channels that is equal to or above a threshold. Specifically, if only one half, one fourth, etc., of the training time set in advance is left, the reconstruction unit 103 may keep only a pathway that has a number of remaining channels of P % or more (P being any integer such as 50) of the whole to reconstruct a model. The value of P need not be a fixed value, and may be increased according to the elapse of the remaining time. For example, as the remaining time becomes one half, one fourth, and one eighth of the entire time, the value of P may be sequentially increased by the amount of 1 or 2.

Further, a pathway may be forcibly deleted according to the remaining time. For example, if the remaining time becomes one half of the entire time, the reconstruction unit 103 may delete a pathway having the smallest number of remaining channels, and if the remaining time becomes one fourth of the entire time, the reconstruction unit 103 may delete a pathway having the smallest number of remaining channels at this point. Performing the pruning and the reconstruction while changing the reconstruction conditions in consideration of the budget and the time in this manner can make the pruning proceed within an expected training time.

Also, even if a certain pathway cannot be deleted in the pruning processing, if there is a negative correlation between this pathway and another pathway, multiple candidate models for reconstruction which are respectively deprived of either one of the pathways may be generated.

The case where there is a negative correlation between the pathways will be described with reference to FIG. 7.

FIG. 7 is a plot diagram showing the relationship between the pathways in terms of the number of channels for each pruning result, wherein the number of channels in the pathway 1 is shown in the horizontal axis and the number of channels in the pathway 2 is shown in the vertical axis. As shown in the plot diagram, as the number of channels in the pathway 1 increases, the number of channels in the pathway 2 decreases; conversely, as the number of channels in the pathway 2 increases, the number of channels in the pathway 1 decreases. For example, the display control unit 105 may cause a straight line 71 that is approximated to a group of points through linear regression to be displayed. In this manner, through the training and the pruning performed multiple times, the reconstruction unit 103 may generate a candidate model for reconstruction with the pathway 1 deleted and the pathway 2 retained and a candidate model for reconstruction with the pathway 2 deleted and the pathway 1 retained, for example, if the determination unit 104 can determine that there is such a negative correlation (trade-off) between the pathways; and the training process shown in FIG. 6 may be performed.

The display control unit 105 may plot a pruning result on a graph each time the pruning result is obtained, and cause an external display device such as a display to display the graph shown in FIG. 7.

Next, an example of displaying the pruning results will be described with reference to FIG. 8.

FIG. 8 is a table partially showing the pruning history of the pruning results of the respective pathways obtained in the pruning operations performed multiple times. Specifically, it associates the numbers of remaining channels of the pathways 1 to 3 with one another for each of the pruning operations. The symbol "-" indicates the case where there is no applicable value because the pathway has been deleted based on an immediately preceding pruning result. When the display control unit 105 causes the table to be displayed on the display, a user can easily understand which pathway can be deleted.

Also, in the example shown in FIG. 8, the pathway which has obtained a pruning result indicating that the number of remaining channels is zero is displayed in a highlighted manner by hatching the cells of the pathways having a number of remaining channels that is equal to or below a threshold. The manner of display is not limited thereto; the pathway having a number of remaining channels that allow deletion of the pathway may be displayed distinguishably from the other pathways by, for example, changing the color of the characters or using boldface type. This enables a user to easily understand which pathway can be deleted. Conversely, the cell of the pathways having a number of remaining channels that is greater than a threshold may be displayed in a highlighted manner. This makes it possible to easily identify a stable pathway.

According to the embodiment described above, a neural network constituted by multiple pathways is trained, and a pruning result of the trained neural network is output based on a threshold. Next, a candidate model for reconstruction is reconstructed from the trained model based on the pruning result. If it is determined from the remaining pathways of the candidate model for reconstruction that re-training is necessary, the process of re-training and pruning the candidate model for reconstruction is repeated; and if it is determined that re-training is unnecessary, the candidate model for reconstruction is output as a final reconstructed model. Thus, it is possible to perform pruning in stages regardless of the stability of the pruning results and further accelerate pruning with a smaller model size. This results in efficient optimization of the pathway.

Next, an exemplary hardware configuration of the learning apparatus 10 according to the foregoing embodiment will be described with reference to the block diagram shown in FIG. 9.

The learning apparatus 10 includes a central processing unit (CPU) 91, a random access memory (RAN) 92, a read only memory (ROM) 93, a storage 94, a display 95, an input device 96, and a communication device 97, which are connected to one another via a bus.

The CPU 91 is a processor that executes arithmetic processing and control processing according to one or more programs. The CPU 91 uses a prescribed area in the RAM 92 as a work area to perform the processing of each component of the learning apparatus 10 described above in cooperation with one or more programs stored in the ROM 93, the storage 94, etc.

The RAM 92 is a memory such as a synchronous dynamic random access memory (SDRAM). The RAM 92 functions as a work area of the CPU 91. The ROM 93 is a memory that stores programs and various types of information in a manner that does not permit rewriting.

The storage 94 is a device that writes and reads data to and from a magnetic recording medium, such as a hard disk drive (HDD), a semiconductor storage medium, such as a flash memory, a magnetically recordable storage medium, such as an HDD, or an optically recordable storage medium. The storage 94 writes and reads data to and from a storage medium under the control of the CPU 91.

The display 95 is a display device such as a liquid crystal display (LCD). The display 95 displays various types of information based on a display signal from the CPU 91.

The input device 96 is an input device such as a mouse and a keyboard. The input device 96 receives information input by the user as an instruction signal, and outputs the instruction signal to the CPU 91.

The communication device 97 communicates with external devices via a network under the control of the CPU 91.

The instructions indicated in the process steps described in the above embodiment can be implemented based on a software program. It is also possible to achieve the same effects as those provided by the control operation executed by the learning apparatus described above by having a general-purpose computer system store the program in advance and read the program. The instructions described in the above embodiment are stored, as a program executable by a computer, in a magnetic disk (flexible disk, hard disk, etc.), an optical disc (CD-ROM, CD-R, CD-RW, DVD-ROM, DVD±R, DVD±RW, Blu-ray (registered trademark) disc, etc.), a semiconductor memory, or a similar storage medium. The storage medium here may utilize any storage technique provided that the storage medium can be read by a computer or by a built-in system. The computer can implement the same operation as the control operation performed by the learning apparatus according to the above embodiment by reading the program from the storage medium and causing, based on the program, the CPU to execute the instructions described in the program. The computer may, of course, acquire or read the program through a network.

Also, an operating system (OS) working on a computer, database management software, middleware (MW) of a network, etc., may execute a part of the processing for realizing the embodiment based on the instructions of a program installed from a storage medium onto a computer and a built-in system.

Furthermore, the storage medium according to the embodiment is not limited to a medium independent from a computer or a built-in system, and may include a storage medium storing or temporarily storing a program downloaded through a LAN or the Internet, etc.

In addition, the number of storage media is not limited to one. The embodiment includes the case where the process is executed using a plurality of storage media, and the storage media can take any configuration.

The computer or built-in system in the present embodiments are used to execute each process in the embodiment, based on a program stored in a storage medium, and the computer or built-in system may be an apparatus consisting of a PC, a microcomputer or the like, or may be a system or the like in which a plurality of apparatuses are connected through a network.

The computer adopted in the embodiment is not limited to a PC; it may be a calculation processing apparatus, a microcomputer, or the like included in an information processor, and a device and apparatus that can realize the functions of the embodiments by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A learning apparatus comprising a processor configured to:

train a neural network model having a plurality of pathways arranged between an input layer and an output layer, the neural network model including hidden layers with parameters comprising weight coefficients or channels and generate a trained model;

perform pruning on the trained model by calculating, for each pathway, an L2 norm of each channel in the hidden layer included in the pathway, and the number of channels having an L2 norm larger than a predetermined threshold;

generate a candidate model for reconstruction by deleting a pathway in which the number of channels having the L2 norm larger than the predetermined threshold is equal to or less than a threshold, and constructing the candidate model with the remaining pathways;

determine whether deletion of a further pathway included in the candidate model for reconstruction is possible, the determination being based on whether a remaining pathway has the number of channels equal to or less than the threshold;

if it is determined that deletion of the further pathway is possible, subject the candidate model for reconstruction to each of the training, the pruning, and the generating in an iterative manner to stabilize pruning results and progressively reduce the number of pathways until no further pathway deletion is possible; and cause a display device to display a pruning history of the candidate model.

2. The apparatus according to claim 1, wherein if there is no pathway that is deletable among pathways included in the candidate model for reconstruction, or if a predetermined termination condition is satisfied, the processor selects the candidate model for reconstruction as a reconstructed model for which the pruning has been completed.

3. The apparatus according to claim 1, further comprising a storage, wherein the processor is configured to:

perform the pruning on the neural network model or the candidate model for reconstruction multiple times, and store, in the storage, the pruning history which associates a history of pruning results of the pruning performed multiple times and a history of the candidate model for reconstruction based on the respective pruning results.

4. The apparatus according to claim 3, wherein the processor is configured to reconstruct a candidate model for reconstruction based on the pruning history.

5. The apparatus according to claim 3, wherein the processor is configured to determine whether re-training is necessary or not based on the pruning history.

6. The apparatus according to claim 3, wherein the processor is configured to perform the pruning multiple times while changing a threshold relating to the pruning.

7. The apparatus according to claim 3, wherein the processor is further configured to cause the number of remaining parameters of each of the pathways to be displayed as the pruning history on a display.

8. The apparatus according to claim 7, wherein the processor is configured to cause (a) a pathway in which the number of remaining parameters is equal to or below a first threshold or (b) a pathway in which the number of remaining parameters is equal to or above a second threshold to be displayed in a highlighted manner, the second threshold being greater than the first threshold.

9. The apparatus according to claim 1, wherein the processor is configured to:

perform the pruning on the neural network model or the candidate model for reconstruction multiple times, and if there are a plurality of candidate models for reconstruction differing from each other in deleted pathway, determine whether or not deletion of a further pathway is possible from each of the candidate models for reconstruction.

10. The apparatus according to claim 1, wherein the processor is configured to:

perform the pruning on the neural network model or the candidate model for reconstruction multiple times;

determine whether or not there is a negative correlation between a plurality of pathways included in the neural network model or between a plurality of pathways included in the candidate model for reconstruction, and in the presence of the negative correlation, generate a plurality of candidate models for reconstruction differing from each other in deleted pathway among the plurality of pathways.

11. The apparatus according to claim 1, wherein the number of parameters is at least one of a number of weight coefficients or a number of channels.

12. The apparatus according to claim 1, wherein the processor is configured to train the neural network model and the candidate model for reconstruction in a training method that causes sparsification in units of channels.

13. A learning method comprising:

training a neural network model having a plurality of pathways arranged between an input layer and an output layer, the neural network model including hidden layers with parameters comprising weight coefficients or channels and generating a trained model;

performing pruning on the trained model by calculating, for each pathway, an L2 norm of each channel in the hidden layer included in the pathway, and the number of channels having an L2 norm larger than a predetermined threshold;

generating a candidate model for reconstruction by deleting a pathway in which the number of channels having the L2 norm larger than the predetermined threshold is equal to or less than a threshold, and constructing the candidate model with the remaining pathways;

determining whether deletion of a further pathway included in the candidate model for reconstruction is possible or not, the determination being based on whether a remaining pathway has the number of channels equal to or less than the threshold;

if it is determined that deletion of the further pathway is possible, subjecting the candidate model for reconstruction to each of the training, the pruning, and the generating in an iterative manner to stabilize pruning results and progressively reduce the number of pathways until no further pathway deletion is possible; and causing a display device to display a pruning history of the candidate model.

\* \* \* \* \*